United States Patent Office 3,514,472
Patented May 26, 1970

3,514,472
CERTAIN BIS-(POLYCHLORO-2-HYDROXY-PHENYL)ACETIC ACID LACTONES
Philip A. Berke, 72 Greenwood Drive, Millburn, N.J. 07041, and William E. Rosen, 86 Canoe Brook Parkway, Summit, N.J. 07901
No Drawing. Original application Oct. 20, 1965, Ser. No. 499,054. Divided and this application June 24, 1969, Ser. No. 844,243
Int. Cl. C07d 5/40
U.S. Cl. 260—343.3      5 Claims

ABSTRACT OF THE DISCLOSURE

Lactones of the formula:

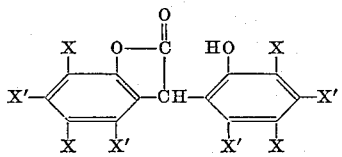

wherein X and X' are halogen or hydrogen, exhibit strong antiseptic and disinfectant action against a wide variety of microorganisms. These compounds are, inter alia, effective fungicides.

This is a divisional of our application Ser. No. 499,054, filed Oct. 20, 1965, now U.S. Pat. 3,471,537.

This invention relates to new diphenolic compounds, their derivatives and salts and to the production thereof.

More particularly, our invention is concerned with diphenolic acetic acid compounds, their derivatives and salts. These compounds exhibit strong antiseptic and disinfecting action against a wide variety of micro-organisms. These compounds are also effective fungicides.

Our compounds may be represented by the general formula:

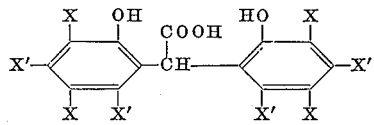

wherein X and X' represent halogen or hydrogen, and salts of said compounds. Valuable homologs of these compounds include those represented by the general formula:

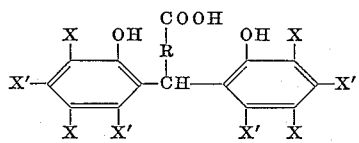

wherein R represents a polymethylene or lower alkylidene such as methylene, ethylidene, propylidene, etc., and salts of said derivatives.

The compounds of the present invention possess antimicrobial properties when employed either in solid form, in solution, emulsion admixtures and the like with other active or inert substances such as soaps, detergents, toothpowders, toothpaste, ointments, creams, cosmetics, rubber goods, paints, jet fuel, or any preparation requiring antimicrobial properties. Solutions can readily be made in alcohol, aqueous alcohol, in mixtures of alcohol, acetone and water, in isopropyl alcohol or aqueous isopropyl alcohol. Such solutions are valuable as skin disinfectants and as fungicidal agents.

Salts of our compounds include the sodium, potassium, ammonium, silver, copper, zinc, mercury, cadmium, zirconium, bismuth, lead, arsenic, tin, and aluminum salts, but almost any element, inorganic or organic complex capable for forming a cation could form salt-like compounds. Our acetic acid compounds are diphenolic, so that salts may be formed from one, two, or three acidic groupings. Although not all combinations of all cations with all anions are equally advantageous, depending upon convenience of preparation, or biological activity, a number of salts can be formed with a particular cation.

Our acetic acid compounds readily form stable γ-lactone derivatives under acidic conditions. These lactones, in turn, may be converted to acid salts by strong bases. The alkali metal salts are usually highly water-soluble and the corresponding lactones are usually water-insoluble.

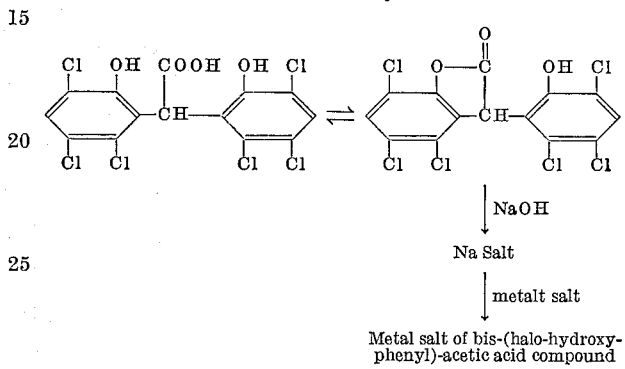

Metal salt of bis-(halo-hydroxyphenyl)-acetic acid compound

The combination of ready interconvertibility of lactone and acid salts with their very different water solubilities permits the use of these compounds as germicides in a unique manner. For example, the lactone can be dissolved readily in aqueous sodium hydroxide, thus exposing the aqueous alkaline solution to germicidal action for a suitable period of time, and then the germicide can be effectively removed from solution by acidification to reform the water-insoluble lactone. Another example of novel application is the penetration by an aqueous alkaline solution of acetic acid salt into a porous solid, followed by the precipitation of the corresponding lactone by acidification; this procedure leaves a stable, water-insoluble germicide in the otherwise inaccessible regions of the porous solid. Other applications will be obvious to those skilled in the art.

Although the lactone forms readily on acidification of an aqueous alkaline solution of acid salt, it does not form readily when the aqueous alkaline solution is only neutralized. It is possible to lower the pH of an aqueous alkaline solution of acid salt to approximately 7, and leave biologically active compound in solution for long periods of time. It is therefore possible to effect germicidal action under neutral aqueous conditions as well as under alkaline aqueous conditions.

The solubilities of the various salts and derivatives are different in the different series, but a common feature is the general solubility of metal salts in alcohols. Thus, for example, the sodium, copper, zinc, and cadmium salts of bis-(3,5,6-trichloro-2-hydroxyphenyl) acetic acid have solubilities greater than 10% both in ethyl alcohol and in ethylene glycol monomethyl ether. As another example, the zinc salt of bis-(3,5-dichloro-2-hydroxyphenyl) acetic acid is soluble in ethyl alcohol to the extent of at least 20% although zinc oxide itself is insoluble in ethyl alcohol. The germicidal properties of these compounds can be more effectively utilized in view of their relatively high solubility in alcohols.

The preparation of these acetic acid derivatives is effected by the condensation of two molecules of a phenolic compound with one molecule of aldehyde. The phenol, here a halophenol, must have an active site available for condensation, ortho- or para- to the phenolic group. The phenol may be represented by the formula:

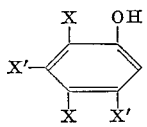

wherein X and X' are halogen or hydrogen and at least one X is hydrogen. The preferrer phenols are those wherein X and X' are chlorine, bromine or hydrogen with at least one X being hydrogen, and the aldehyde, such as glyoxylic acid or a derivative thereof must be sufficiently reactive for the reaction to proceed beyond a mere addition product with the phenol. The reaction is carried out in a halogenated hydrocarbon solvent such as ethylene dichloride, and in the presence of a suitable strong acid catalyst such as chlorosulfonic acid, sulfuric acid, or oleum under appropriate conditions of time and temperature. These conditions may vary widely; for example the reaction time may be in the general range of a few minutes to several hours and the temperature may range from room temperature to 100 or more degrees Centigrade; generally it is convenient to carry out the reaction at the refluxing temperature of the reaction solvent. Other derivatives within the scope of our invention

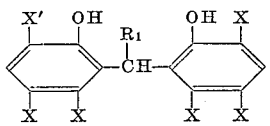

or

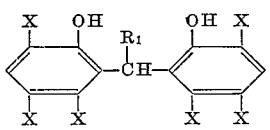

wherein $R_1$ represents in addition to a carboxylic acid group and esters thereof, derivatives of carboxylic acids such as amides, hydroxamine acids, anhydrides and nitriles and X is halogen and especially chlorine. $R_1$ may also be connected to the CH bridge via R, which has the above defined meaning and these compounds may be represented by the formula:

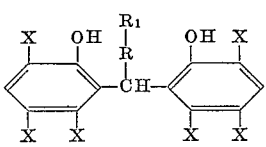

or

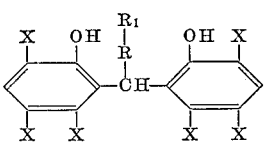

wherein X is halogen and especially chlorine.

EXAMPLE I

Water was removed from 20 g. of 50% aqueous glyoxylic acid by distillation at reduced pressure, and to the wet residue of glyoxylic acid monohydrate was added 53 g. of 2,4,5-trichlorophenol and 200 ml. of ethylene dichloride. The stirred reaction mixture was treated with 25 ml. of chlorosulfonic acid over 10 minutes, and the mixture was then refluxed for four hours. The ethylene dichloride layer was separated and the acid layer was extracted with two 50 ml. portions of hot ethylene dichloride. The combined ethylene dichloride solution was treated with decolorizing charcoal, filtered, and concentrated to a volume of 80 ml. On cooling at 5° C., 29 g. of a light yellow crystalline solid separated, M.P. 205–206º. One recrystallization from ethylene dichloride gave white crystals of bis-(3,5,6-trichloro-2-hydroxyphenyl) acetic acid lactone, M.P. 213.5–215.5°.

Analysis.—Calcd. for $C_{14}H_4O_3Cl_6$ (432.90) (percent): C, 38.84; H, 0.93. Found (percent): C, 38.81; H, 1.04.

EXAMPLE II

A solution of 2.0 g. of bis-(3,5,6-trichloro-2-hydroxyphenyl) acetic acid lactone in 10 ml. of distilled water containing 0.37 g. of sodium hydroxide was treated with decolorizing charcoal and filtered. The filtrate was taken to dryness at reduced pressure, leaving 2.3 g. of light yellow crystalline bis-(3,5,6-trichloro-2-hydroxyphenyl) acetic acid disodium salt monohydrate; decomposition point=285°.

Analysis.—Calcd. for $C_{14}H_4O_4Cl_6Na_2 \cdot H_2O$ (512.90) (percent): C, 32.78; H, 1.18. Found (percent): C, 32.67; H, 1.61.

Careful treatment of the sodium salt with acid generated the corresponding bis-(3,5,6-trichloro-2-hydroxyphenyl) acetic acid.

EXAMPLE III

A solution of 2.0 g. of bis-(3,5,6-trichloro-2-hydroxyphenyl) acetic acid lactone in 10 ml. of distilled water containing 0.37 g. of sodium hydroxide was treated with decolorizing charcoal and filtered. The combined filtrate and water wash (5 ml.) was treated with solution of 0.62 g. of cupric chloride in 5 ml. of distilled water. The brown solid precipitate was collected, washed, and dried, giving 2.3 g. of brown bis-(3,5,6-trichloro-2-hydroxyphenyl) acetate acid cupric salt monohydrate, decomposition point =217°.

Analysis.—Calcd. for $C_{14}H_4O_4Cl_6Cu \cdot H_2O$ (530.46) (percent): C, 31.70; H, 1.14. Found (percent): C, 31.71; H, 1.30.

EXAMPLE IV

In a manner similar to that described in Example III, addition of a solution of 0.66 g. of zinc chloride in 5 ml. of distilled water to a solution of the disodium salt of bis-(3,5,6-trichloro-2-hydroxyphenyl) acetic acid precipitated 1.9 g. of the corresponding white zinc salt, decomposition point ca. 297°.

Analysis.—Calcd. for $C_{14}H_4O_4Cl_6Zn \cdot 1\frac{1}{2} H_2O$ (541.31) (percent): C, 31.06; H, 1.30. Found (percent): C, 31.16; H, 1.45.

EXAMPLE V

In a manner similar to that described in Example III, addition of a solution 1.47 g. of mercuric actetate in 5 ml. of distilled water to a solution of the disodium salt precipitated 2.8 g. of the corresponding yellow mercuric salt, decomposition point=166–168°. Analysis.—Calcd. for $C_{14}H_4O_4Cl_6Hg$ (649.51) (percent): C, 25.89; H, 0.62. Found (percent): C, 26.38; H. 0.97.

EXAMPLE VI

In a manner similar to that described in Example III, addition of a solution of 0.84 g. of cadmium chloride in 5 ml. of distilled water to a solution of the disodium salt precipitated 1.3 g. of white cadmium salt, not melting to 300°. Analysis.—Calcd. for $C_{14}H_4O_4Cl_6Cd \cdot \frac{1}{2}H_2O$ (570.32) (percent): C, 29.48; H, 0.88. Found (percent): C, 29.87; H, 1.19.

EXAMPLE VII

Water was removed from 20 g. of 50% aqueous glyoxylic acid by distillation at reduced pressure, and 44 g. of 2,4-dichlorophenol and 200 ml. of ethylene dichloride were added to the wet viscous residue. The stirred reaction mixture was treated with 24 ml. of chlorosulfonic acid over 10 minutes, and the mixture was then refluxed for five hours. The upper ethylene dichloride layer plus two extracts of the lower acid layer with 50 ml. portions of hot ethylene dichloride were combined, treated with decolorizing charcoal, filtered, and concentrated at reduced pressure to 54 g. of a dark viscous oil. The oil was dissolved in 54 ml. of hot toluene and chilled overnight at 5°. The tan solid was collected and dried, giving 32 g. of bis-(3,5-dichloro-2-hydroxyphenyl) acetic acid lactone, M.P. 127–134°. Two recrystallizations from toluene gave a white product, M.P. 138–145°. *Analysis.*—Calcd. for $C_{14}H_6O_3Cl_4$ (364.02) (percent): C, 46.19; H, 1.66. Found (percent): C, 45.78; H, 1.76.

EXAMPLE VIII

A solution of 2.0 g. of bis-(3,5-dichloro-2-hydroxyphenyl) acetic acid lactone in 15 ml. of distilled water containing 0.60 g. of sodium hydroxide was treated with decolorizing charcoal and filtered. The filtrate was taken to dryness at reduced pressure, leaving 2.3 g. of yellow bis-(3,5-dichloro-2-hydroxyphenyl) acetic acid trisodium salt, not melting to 300°. Careful treatment of the sodium salt with acid generated the corresponding bis-(3,5-dichloro-2-hydroxyphenyl) acetic acid.

EXAMPLE IX

A solution of bis-(3,5-dichloro-2-hydroxyphenol) acetic acid lactone in 15 ml. of distilled water containing 0.60 g. of sodium hydroxide was treated with decolorizing charcoal and filtered. The combined filtrate and water wash (5 ml.) was added to a solution of 1.11 g. of zinc chloride in 10 ml. of distilled water with stirring. The precipitate was collected, washed with water, and dried, giving 2.5 g. of white bis-(3,5-dichloro-2-hydroxyphenyl) acetic zinc salt, not melting to 300°. *Analysis.*—Calcd. for $C_{14}H_5O_4Cl_4Zn_{1.5} \cdot 2H_2O$ (513.10) (percent): C, 32.77; H. 177. Found (percent): C, 32.66; H, 1.89.

EXAMPLE X

In a manner similar to that described in Example IX, addition of the aqueous solution of the sodium salt of bis-(3,5-dichloro-2-hydroxyphenyl) acetic acid to a solution of 2.5 g. of mercuric acetate in 10 ml. of distilled water precipitated the corresponding light brown mercuric salt, decomposition point=161°–164°. *Analysis.*—Calcd. for $C_{14}H_5O_4Cl_4Hg_{1.5} \cdot H_2O$ (697.94) (percent): C, 24.09; H, 1.01. Found (percent): C, 24.17; H, 1.28.

EXAMPLE XI

In a manner similar to that described in Example IX, addition of the aqueous solution of the sodium salt of bis-(3,5-dichloro-2-hydroxyphenyl) acetic acid to a solution of 1.0 g. of cupric chloride in 10 ml. of distilled water precipitated 2.3 g. of the corresponding brown cupric salt, shrinking and darkening over 240°, but not melting to 300°.

EXAMPLE XII

In a manner similar to that described in Example IX, addition of the aqueous solution of the sodium salt of bis-(3,5-dichloro-2-hydroxyphenyl) acetic acid to a solution of 1.4 g. of cadmium chloride in 10 ml. of distilled water precipitated 2.5 g. of the corresponding pale yellow cadmium salt.

What we claim is:
1. Bis-(3,5,6-trichloro-2-hydroxyphenyl) acetic acid lactone.
2. Bis-(3,5-dichloro-2-hydroxyphenyl) acetic acid lactone.
3. A compound of the formula:

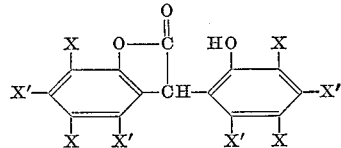

wherein X and X' are halogen or hydrogen.

4. A compound of the formula:

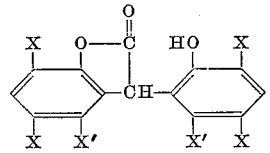

wherein X and X' are halogen or hydrogen.

5. A compound according to claim 4 wherein the halogen is chlorine.

References Cited

UNITED STATES PATENTS 2,170,632   8/1937   Cornwell _____ 260—343.3

ALEX MAZEL, Primary Examiner

A. M. TIGHE, Assistant Examiner

U.S. Cl. X.R.

260—447, 448, 520, 999